(12) United States Patent
Yundt et al.

(10) Patent No.: US 10,770,929 B2
(45) Date of Patent: Sep. 8, 2020

(54) SYSTEM AND METHOD FOR IMPROVED DC POWER LINE COMMUNICATION

(71) Applicant: KOLLMORGEN CORPORATION, Radford, VA (US)

(72) Inventors: George B. Yundt, Andover, MA (US); Robert Pearce, Bristol (GB)

(73) Assignee: KOLLMORGEN CORPORATION, Radford, VA (US)

( * ) Notice: Subject to any disclaimer, the term of this patent is extended or adjusted under 35 U.S.C. 154(b) by 15 days.

(21) Appl. No.: 16/282,982

(22) Filed: Feb. 22, 2019

(65) Prior Publication Data

US 2019/0190322 A1    Jun. 20, 2019

Related U.S. Application Data

(62) Division of application No. 15/274,517, filed on Sep. 23, 2016, now Pat. No. 10,374,468.

(60) Provisional application No. 62/233,328, filed on Sep. 26, 2015.

(51) Int. Cl.
| | |
|---|---|
| *H02J 50/80* | (2016.01) |
| *H01F 38/14* | (2006.01) |
| *H02J 50/10* | (2016.01) |
| *H01F 27/29* | (2006.01) |
| *H04B 3/54* | (2006.01) |
| *H04L 12/10* | (2006.01) |

(52) U.S. Cl.
CPC ............. *H02J 50/80* (2016.02); *H01F 27/29* (2013.01); *H01F 38/14* (2013.01); *H02J 50/10* (2016.02); *H04B 3/548* (2013.01); *H04L 12/10* (2013.01); *H01F 2038/143* (2013.01)

(58) Field of Classification Search
CPC ..................................................... H04B 3/548
See application file for complete search history.

(56) References Cited

U.S. PATENT DOCUMENTS

| | | |
|---|---|---|
| 2006/0078093 A1 | 4/2006 | Karam et al. |
| 2014/0333279 A1 | 11/2014 | Hagemeyer et al. |

OTHER PUBLICATIONS

International Search Report and Written Opinion issued in corresponding international application No. PCT/US2016/053427, dated Dec. 2, 2016.
International Preliminary Report on Patentability and Written Opinion of the International Searching Authority issued in corresponding international application No. PCT/US2016/053427, dated Apr. 5, 2018.

*Primary Examiner* — Daniel Kessie
(74) *Attorney, Agent, or Firm* — Day Pitney LLP

(57) ABSTRACT

A device for communicating and providing power over a cable having at least two conductors comprises an inductor having two secondary windings and one primary winding, and a transceiver coupled to the primary winding of the inductor, the two secondary windings of the inductors being coupled to two of the at least two conductors of the cable. Further, a voltage signal provided by the secondary windings of the inductors to the conductors varies symmetrically from an average potential. The inductor of the device can also comprise two primary windings connected in series and two secondary windings connected in series, the secondary windings also connected to two of the at least two conductors in the cable, wherein the voltage signal provided to the two conductors from the secondary windings varies symmetrically from an average potential.

12 Claims, 3 Drawing Sheets

SYSTEM AND METHOD FOR IMPROVED DC POWER LINE COMMUNICATION

CROSS-REFERENCE TO RELATED APPLICATIONS

This patent application is a division of and claims the benefit of priority to U.S. patent application Ser. No. 15/274,517, filed Sep. 23, 2016 which claims the benefit of priority to U.S. Provisional Patent Application Ser. No. 62/233,328, filed Sep. 26, 2015. The content of each of the above referenced patent applications is incorporated herein by reference in its entirety for any purpose whatsoever.

FIELD OF THE INVENTION

The present invention relates to communications systems and more particularly relates to a system and method for communications between a monitoring device and a sensor over a power line.

BACKGROUND OF THE INVENTION

Industrial control systems, automotive electronics, medical treatment apparatus, naval vessels, aircraft, and security systems are examples of systems which may employ electronic control and monitoring devices connected in a communication network with sensors and actuator devices. In the relevant art, the control devices are generally referred to as "masters" and the sensor and actuator devices are referred to as "slaves".

In some systems, the slaves are both powered by and receive communications from a source that can be regarded as a sub-system of the master. The incoming cable to each slave comprises conductors used for communication, the supply voltage, and a return conductor. To reduce the weight, cost and rigidity of the cable harness that connects the master to the slaves, it is possible to use the conductors that carry the signals for the dual purpose of delivering power to and communicating with the slaves. This dual use of a conductor for both power and communication is known as DC Power Line Communication ("PLC"). In PLC, power and data may be sent between PLC nodes using only two conductors, eliminating the need for additional wires to interconnect devices.

Existing PLC systems have been adapted for systems in which cost and size (component footprint) are not a significant consideration. For example, Power-over-Ethernet (PoE) uses two twisted pairs, and a DC-DC converter at each end of the link. The implementation of PoE is therefore relatively expensive and requires too much circuitry for compact slave devices. Another group of systems use current injection for the transmitter and AC coupled voltage detection for the receiver in such manner that they cannot make use of the numerous off-the-shelf transmitters and receiver integrated circuits that exist for standards such as RS-485. Not only does this complicate their implementation but it also means that it is impractical to design a master or slave that can be used with or without power line communication.

Other PLC systems utilize only a cable shield to protect from common mode interference which may be insufficient in many applications. Exposure to common mode interference is a particularly significant problem in applications in which the DC PLC cable is positioned proximate to an EMC aggressor such as the power conductors to a servo motor. One notable system, described in the Sick-Stegmann GmbH publication "Hiperface DSL Interface Manual" attempts to deal with common mode interference through use of a transformer and impedance-matching but has the drawback that it uses a number of transformer, capacitor and inductor components that occupy a large amount of board area and decrease transmission efficiency.

For example, FIG. 3 illustrates a communication system 300, in which a "master" 302 transmits and receives signals over a communication medium 330 to and from a "slave" 303. The master 302 transmits to the communication medium 330 first through an impedance matching network 304 and transformer 305. The transformer 305 includes a primary side inductor 307 and a secondary inductor 308. A signal path from a first terminal of the secondary inductor 308 leads through capacitor 315 and then branches, with one path leading to a single-winding inductor 322 (which decouples the voltage level from the signal) and another leading to the communication medium 330. Similarly, a signal path from a second terminal of the secondary inductor 308 leads through capacitor 316 and then branches, with one path leading to another single-winding inductor 324 and another leading to the communication medium 330. An analogous arrangement of inductors and capacitors is employed on the slave side of the circuit. The separate, single-winding inductors 322 and 324, which are distinct from the transformer 305, and the additional capacitors 315 and 316 occupy an undue amount of circuit board space and increase the overall costs of the communication circuit.

It would therefore be advantageous to provide a system and method for improved DC power line communication that is robust against common mode interference, is efficient in terms of occupying as little board space as possible, and has improved transmission efficiency.

SUMMARY OF THE INVENTION

According to one embodiment, the present invention provides a device for communicating and providing power over a cable having at least two conductors that comprises a first inductor having a primary and a secondary winding and a second inductor having a primary and a secondary winding, the primary winding of the second inductor being coupled at one end to the primary winding of the first inductor, each of the secondary windings of the first and second inductors being coupled to one of the at least two conductors in the cable. The device also includes a transceiver coupled to the primary windings of the first and second inductors. The first inductor is coupled to local ground potential in a manner that varies the potential of each of the said conductors symmetrically from an average potential.

According to another embodiment, the present invention also provides a device for communicating over a cable having at least two conductors that comprises an inductor having two secondary windings and one primary winding, and a transceiver coupled to the primary winding of the inductor. The two secondary windings of the inductors are coupled to two of the at least two conductors of the cable and a voltage signal is provided by the secondary windings of the inductors to the conductors that varies symmetrically from an average potential.

According to still another embodiment, the present invention also provides a device for communicating and providing power over a cable having at least two conductors that comprises an inductor having two primary windings connected in series and two secondary windings connected in series, the secondary windings also connected to two of the at least two conductors in the cable, and a transceiver coupled to the two primary windings of the inductor. The voltage signal provided to the two conductors from the secondary windings varies symmetrically from an average potential.

According to still another embodiment, the present invention provides a PLC communication system for communicating and providing power over a cable having at least two conductors that comprises a master device including a first inductor having a primary and a secondary winding, a second inductor having a primary and a secondary winding, the primary winding of the second inductor being coupled at one end to the primary winding of the first inductor, each of the secondary windings of the first and second inductors being coupled to one of the at least two conductors in the cable, and a transceiver coupled to the primary windings of the first and second inductors. The first inductor is coupled to local ground potential, in a manner that varies the potential of each of the said conductors symmetrically from an average potential. The PLC communication system further comprises a slave device that includes a first inductor having a primary and a secondary winding, a second inductor having a primary and a secondary winding, the primary winding of the second inductor being coupled at one end to the primary winding of the first inductor, each of the secondary windings of the first and second inductors being coupled to one of the at least two conductors in the cable, and a transceiver coupled to the primary windings of the first and second inductors.

DETAILED DESCRIPTION

In order to provide an improved communication system between a master such as a servo drive and a slave such as a position sensor, and to overcome the disadvantages and problems of currently available devices, the present invention provides DC PLC system that efficiently makes use of fewer and smaller components, dramatically reducing component footprint and board size, and simultaneously improving transmission efficiency.

Figure 1:
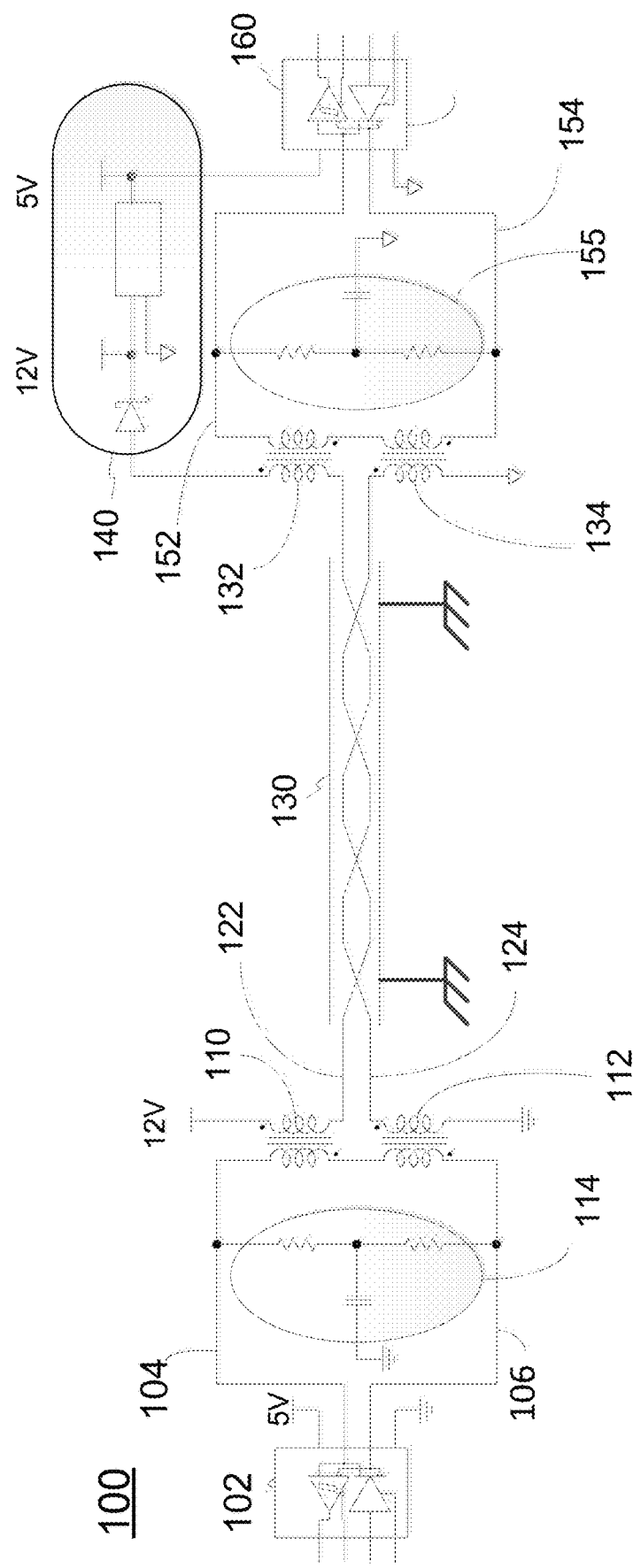
FIG. 1 is a schematic circuit diagram of a DC power line communication system according to an exemplary embodiment of the present invention.

FIG. 1 is a schematic circuit diagram of an exemplary embodiment of a PLC system according to the present invention. In the system 100, a master transceiver 102 transmits (and also receives) signals on respective +V/2 and −V/2 signal lines 104, 106. Signal line 104 is coupled to a first side of a primary winding of a first inductor 110, while signal line 106 is coupled to a second side of primary winding of a second inductor 112. The first and second (coupled) inductors 110, 112 may be implemented using stock items that are used in mass-market applications such as DC-DC converters that are smaller and less costly than the combination of pulse transformers with single-winding inductors that would otherwise be required. Preferably, inductors 110, 112 have low DC resistance of approximately 1-2Ω and a much higher impedance at high frequency, for example 1.25 kΩ at 2 MHz, allowing power to be supplied without interfering with communication. In addition, the impedance of inductors 110, 112 should be approximately equal to ensure the symmetry of the communication signal.

The second end of the primary winding of the first inductor 110 is coupled directly to the first side of the primary winding of the second inductor 112. In the system depicted, an impedance matching network 114 including two resistors in series and a capacitor is coupled across the signal lines 104, 106 between the master 102 and inductors 110, 112. The impedance matching network is designed to match the impedance of a twisted pair cable at the desired transmission frequency.

Referring now to the secondary windings of inductors 110, 112, the first end of the secondary winding of inductor 110 is coupled to a DC power source reference voltage (e.g., +12V), and the second end of the secondary winding of inductor 110 is coupled to a first (master) end of conductor 122 of a twisted conductor pair. With regard to the second inductor 112, the second end is coupled to a reference voltage (e.g., ground) while the first end is coupled to the first (master) end of second conductor 124 of the twisted pair. Both conductors 122, 124 may optionally be enclosed in a shielded cable 130. The conductors 122, 124 transmit both power and command signals from the master side of the circuit the slave side. Signal communication varies symmetrically between conductors 122, 124.

Figure 2:
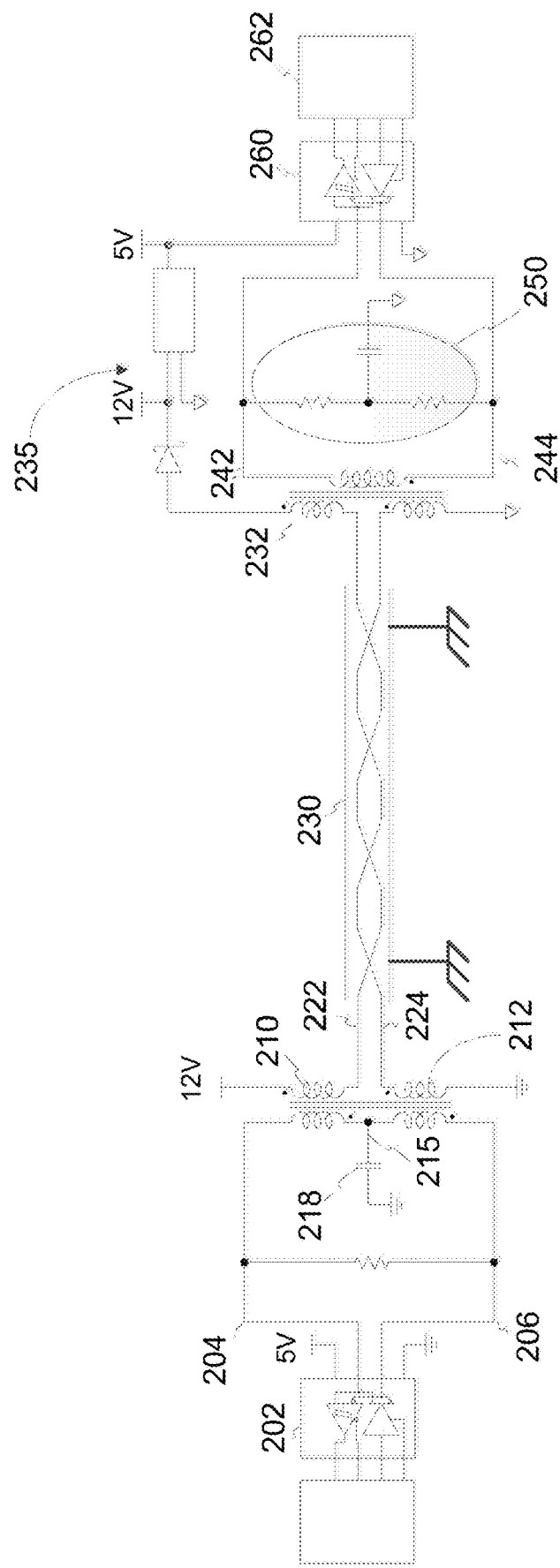
FIG. 2 is a schematic circuit diagram of a DC power line communication system according to another exemplary embodiment of the present invention.
Figure 3:
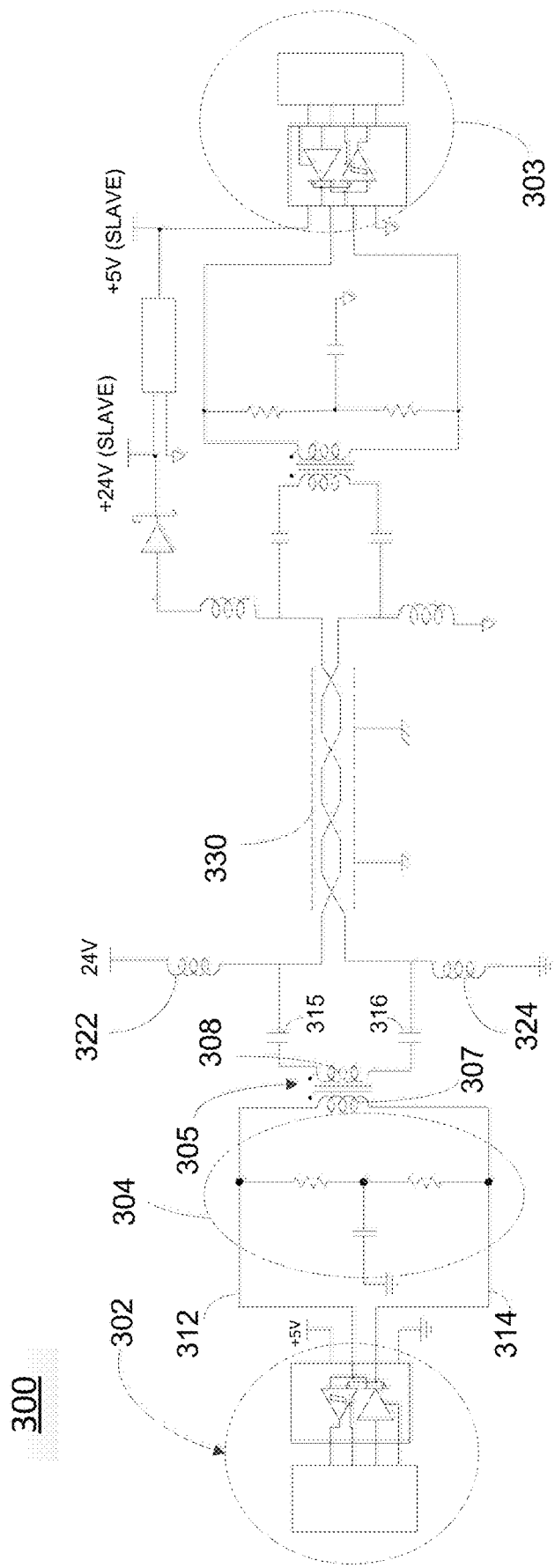
FIG. 3 is a schematic circuit diagram of a DC power line communication system known in the art.

The transceiver circuits depicted in FIG. 1 and FIG. 2 are suited to half-duplex communication wherein either the master or the slave may transmit over the conductors alternatively, as is typical in industrial systems. However, the disclosed teachings herein are not confined to half-duplex communication. For example, use of hybrid transceivers used in gigabit Ethernet communication may employ full-duplex communication.

Referring now to the slave side of the circuit, the second (slave) end of conductor 122 is coupled a second side of a secondary winding of third inductor 132, while the second (slave) end of conductor 124 is coupled to the first side of a secondary winding of fourth inductor 134. The third and fourth inductors 132, 134 may also be implemented using small, relatively inexpensive components. Preferably, inductors 132, 134 have low DC resistance of approximately 1-2Ω and a much higher impedance at high frequency, for example 1.25 kΩ at 2 MHz. The first side of the secondary winding of third inductor 132 is coupled to a power regulation circuit 140 which provides DC power to the slave device, while the second side of the secondary side of fourth inductor 134 is coupled to a reference voltage (e.g., ground). As inductor 132 has low impedance to the DC power signal, it effectively diverts the power signal to the power regulation circuit 140. The power regulation circuit 140 may include a diode arranged in series with a step-down voltage regulation to bring the DC voltage level down to the appropriate level for the slave device. The designer has the option of using the same inductors for elements 110, 112, 132 and 134.

Similarly to the arrangement on the master side, the first side of the secondary winding of inductor 132 is coupled to signal line 152 of slave transceiver 160, and second side of the secondary winding of inductor 134 is coupled to signal line 154 of slave transceiver 160, while the second side of inductor 132 and the first side of inductor 134 are coupled directly to each other. A second impedance matching network 155 including a voltage divider and a capacitor is arranged in parallel to inductors 132, 134 across input lines 152, 154 between the inductors and the slave transceiver 160.

In terms of operation, when master transceiver 102 transmits a differential voltage (V), then a voltage V/2 occurs across each of the series connected primary windings of inductors 110, 112 which have equal inductances and turn ratios. Owing to the magnetic coupling of the primary and secondary windings, the voltage across the secondary windings of inductors 110, 112 is also V/2 with the exception of a small DC bias voltage owing to the DC current supplied to the slave. The polarity of the voltages is in accordance with the dot convention. The inductors provide high impedance to the AC communication signals but essentially no impedance to the DC power rail voltage. This allows DC power to be transmitted without significant attenuation from the power rails on the master side to the power regulation circuit on the slave side of the circuit. Conversely, when the AC communication signals are received at the secondary windings of the inductors from the pair of conductors, voltages generated across the windings are transferred by magnetic coupling to the primary windings and thereby to the opposite transceiver. In this manner, the circuit decouples the DC power signal from the AC communication signal.

Another embodiment of a PLC system 200 according to the present invention is shown in FIG. 2. In this embodiment a master transceiver 202 transmits (and also receives) signals on respective +V/2 and −V/2 signal lines 204, 206. In the embodiment of FIG. 2, the signal lines are coupled to a single 4-winding inductor rather than two separate 2-winding inductors. More specifically, signal line 204 is coupled to a first side of a first primary winding of inductor 210, signal line 206 is coupled to a second side of a second primary winding of a second inductor 210 and the second end of the first primary winding of the first inductor 210 is coupled directly to the first side of the second primary winding. As in the embodiment of FIG. 1 a differential voltage of V/2 occurs across both the first and second primary and corresponding secondary windings of the inductors on the master side of the circuit. However, since these voltages are all equal it is possible to arrange for all four windings of coupled inductors 210 to encircle a common magnetic core, i.e. to combine coupled inductors into a single 4-winding coupled inductor as shown.

A center tap 215 of the connected primary windings of inductor 210 is connected directly or via a capacitor 218 to a fixed reference potential. In the example shown, the center tap 215 is directly connected to ground which has the benefits that the two primary windings act as an autotransformer that confers additional common mode immunity, and that the center tap connection to ground provides a path to divert current arising from inter-winding capacitance. In addition, connecting the center tap 215 directly or via capacitor 218 to a fixed potential allows the termination impedance matching network to be simplified to a single resistor 220 as the center tap 215 of coupled inductor 210 defines the common mode potential for transceiver 202.

Referring again to FIG. 2, the first side of the first secondary winding of inductor 210 is coupled to a reference DC voltage, and the second side of the first secondary winding is coupled to a first conductor 222 of a pair conductors (222, 224) enclosed in a cable 230. Similarly, the first side of the second secondary winding of inductor 210 is coupled to the second conductor 224 and the second side of the secondary winding is coupled to a reference voltage (e.g., ground). The cable 230 may also be shielded to reduce interference.

On the slave side of the system, instead of a 4-winding inductor, a 3-winding inductor 232 is shown. To be clear, it is noted that in accordance with the present invention either or both of the master side inductor 210 and the slave side inductor may have 4 windings or 3 windings, so that any combination of 3 and 4 winding inductors may be used depending on convenience (for example, it is often simpler to manufacture a coupled inductor with four identical windings instead of three windings that are not all the same). It may be advantageous to arrange for the two primary windings of inductor 232 to have a set number (N) turns and the secondary winding to have double the number of turns (2×N) as this gives an overall 1:1 ratio for signal transmission, thus preserving the amplitude of the transmitted and received signals.

The first side of the first primary winding of inductor 232 is coupled to a power regulation circuit 235 which provides DC power for the slave transceiver 260 and device 262. The power regulation circuit 140 may include a diode arranged in series with a step-down voltage regulation to bring the DC voltage level down to the appropriate level for the slave device. The second side of the first primary winding of inductor 232 is coupled to the first side of the second primary winding, while the second side of the second primary winding is coupled to a reference voltage (e.g. ground). Signals lines 242, 244 extend from the first and second sides of the secondary winding of inductor 232. Across signals lines 242, 244 is an impedance matching network 250 similar to those shown in FIG. 1 used for matching the impedance to the cable conductors. Signal lines 242, 244 terminate at slave transceiver 260.

The embodiment of PLC systems according to the present invention shown in FIGS. 1 and 2 are virtually impervious to surges of common mode interference that can occur when a signal cable (e.g., 130, 230) is bundled together with an EMC aggressor cable. If an electrical surge occurs on the conductors, it does not bridge the air gap between the primary and secondary sides of the inductors on either the master or slave sides of the circuit which are magnetically rather than electrically coupled. Furthermore, sudden transients are strongly damped by action of the inductors so that the magnetic coupling is also correspondingly small when surges occur. The inductors are considerably smaller and less costly than transformers, which typically perform these functions.

As a result, the inductors are cheaper than the combination of pulse transformers and pair of single winding inductors that would otherwise be necessary and occupy considerably less board space. It is found that the embodiments of FIGS. 1 and 2 are nearly half as costly, occupy only a quarter of the board area, and only approximately one-eighth of the effective volume used in conventional transformer-based PLC systems. Another advantage is that the received signal with the new circuit is on the order of 10% larger in amplitude, which allows longer cables to be used. Further advantages of the systems of the present invention include the ability to select more desirable components. It is also now possible to manufacture relatively smaller products, especially multi-axis products and encoders, when compared to others in the industry. Tall components are also likewise eliminated, thereby further enabling smaller products. The benefits accrue to both masters (drives, controllers) and slaves (feedback devices/encoders).

It will be understood by those of ordinary skill in the art that various changes may be made and equivalents may be substituted for element without departing form the scope of the invention. In addition, many modifications may be made to adapt a particular feature of material to the teachings of the invention without departing from the scope thereof. Therefore, it is intended that the invention not be limited to the particular embodiments disclosed, but that the invention will include all embodiments falling within the scope of the claims.

What is claimed is:

1. A device for communicating over a DC power line cable having at least two conductors, comprising: a first single core inductor having two secondary windings and one primary winding; and a transceiver coupled to the primary winding of the first single core inductor; wherein the two secondary windings of the first single core inductor are coupled on a first end to two of the at least two conductors of the DC power line cable and on a second end to a DC power supply; and wherein the first single core inductor provides magnetically coupled communication between the transceiver and the two of the at least two conductors in the DC power line cable; and wherein a first winding of the second end of the two secondary windings of the first single core inductor is coupled to a DC voltage supply and a second winding of the second end of the two secondary windings is coupled to a ground connection to provide power to the DC power line cable.

2. A device according to claim 1, further comprising: a second single core inductor having two secondary windings and one primary winding; and a transceiver coupled to the primary winding of the a second single core inductor; wherein the two secondary windings of the a second single core inductor are coupled on one end to said two of the at least two conductors of the DC power line cable and on another end to a DC load.

3. A device according to claim 1, further comprising: a second single core inductor having two primary windings connected in series and two secondary windings connected on one end to two of the at least two conductors in the DC power line cable and on another end to a DC load; and a transceiver coupled to the two primary windings of the second single core inductor.

4. A device for communicating over a DC power line cable having at least two conductors, comprising: a first single core inductor having two secondary windings and one primary winding; and a transceiver coupled to the primary winding of the first single core inductor; wherein the two secondary windings of the first single core inductor are coupled on a first end to two of the at least two conductors of the DC power line cable and on a second end to a DC load; and wherein the first single core inductor provides magnetically coupled communication between the transceiver and the two of the at least two conductors in the DC power line cable; and wherein a first winding of the second end of the two secondary windings of the first single core inductor draws power from the DC power line cable and a second winding of the second end of the two secondary windings is coupled to a ground connection.

5. A device for communicating over a DC power line cable having at least two conductors, comprising: a first single core inductor having two primary windings connected in series and two secondary windings connected on a first end to two of the at least two conductors in the DC power line cable and on a second end to a DC load; and a transceiver coupled to the two primary windings of the first single core inductor; wherein the first single core inductor provides magnetically coupled communication between the transceiver and the two of the at least two conductors in the DC power line cable; and wherein a first winding of the second end of the two secondary windings of the first single core inductor draws power from the DC power line cable and a second winding of the second end of the two secondary windings is coupled to a ground connection.

6. The device according to claim 5, further comprising: a center tap connected to a fixed potential and coupled between the two primary windings of the first single core inductor.

7. The device according to claim 5, further comprising: a capacitor coupled between the center tap and a fixed potential.

8. A device for communicating over a DC power line cable having at least two conductors, comprising: a first single core inductor having two primary windings connected in series and two secondary windings connected on a first end to two of the at least two conductors in the DC power line cable and on a second end to a DC power supply; and a transceiver coupled to the two primary windings of the first single core inductor; wherein the first single core inductor provides magnetically coupled communication between the transceiver and the two of the at least two conductors in the DC power line cable; and wherein a first winding of the second end of the two secondary windings of the first single core inductor is coupled to a DC voltage supply and a second winding of the second end of the two secondary windings is coupled to a ground connection.

9. The device according to claim 8, further comprising: a center tap connected to a fixed potential and coupled between the two primary windings of the first single core inductor.

10. The device according to claim 8, further comprising: a capacitor coupled between the center tap and a fixed potential.

11. A device according to claim 8, further comprising: a second single core inductor having two secondary windings and one primary winding; and a transceiver coupled to the primary winding of the a second single core inductor; wherein the two secondary windings of the a second single core inductor are coupled on one end to said two of the at least two conductors of the DC power line cable and on another end to a DC load.

12. A device according to claim 8, further comprising: a second single core inductor having two primary windings connected in series and two secondary windings connected on one end to two of the at least two conductors in the DC power line cable and on another end to a DC load; and a transceiver coupled to the two primary windings of the second single core inductor.

* * * * *